United States Patent [19]

Shiraki et al.

[11] 4,161,511

[45] Jul. 17, 1979

[54] PROCESS OF REFINING SODIUM HEXAFLUOROSILICATE

[75] Inventors: Yoshiro Shiraki, Yamaguchi; Hiroshi Haraoka; Hiromichi Arai, both of Ube, all of Japan

[73] Assignee: Central Glass Company, Limited, Yamaguchi, Japan

[21] Appl. No.: 873,883

[22] Filed: Jan. 31, 1978

[30] Foreign Application Priority Data

Feb. 1, 1977 [JP] Japan .................................... 52-9284

[51] Int. Cl.$^2$ ............................................. C01B 33/10
[52] U.S. Cl. .................................. 423/341; 423/155; 423/184; 423/202
[58] Field of Search .............. 423/341, 179, 184, 196, 423/197, 199, 201, 202, 208, 155, 158; 23/293 R, 296, 304

[56] References Cited

U.S. PATENT DOCUMENTS

| | | | |
|---|---|---|---|
| 2,954,275 | 9/1960 | Carothers et al. | 423/341 X |
| 3,055,733 | 9/1962 | Lang et al. | 423/341 X |
| 3,607,016 | 9/1971 | Barilli | 423/341 X |
| 3,795,728 | 3/1974 | Scheel | 423/341 |
| 3,915,659 | 10/1975 | Kadotani et al. | 23/293 R |
| 4,060,586 | 11/1977 | Sardisco et al. | 423/167 |

*Primary Examiner*—Edward J. Meros
*Attorney, Agent, or Firm*—Fleit & Jacobson

[57] ABSTRACT

Crude sodium hexafluorosilicate containing gypsum and various metal phosphates is refined into highly pure and sufficiently large crystals. First, the crude fluorosilicate is treated with a sodium chloride solution to dissolve gypsum. Then the solid phase is reconstituted into an aqueous slurry in which the concentration of Na is limited. This slurry is acidified and maintained at temperatures not lower than 80° C. with continued stirring to cause recrystallization of sodium hexafluorosilicate.

8 Claims, 3 Drawing Figures

PROCESS OF REFINING SODIUM HEXAFLUOROSILICATE

BACKGROUND OF THE INVENTION

This invention relates to a process for refining of a crude sodium hexafluorosilicate containing gypsum and phosphates as impurities.

Sodium hexafluorosilicate (sodium silicofluoride) is obtained largely as a by-product of wet process phosphoric acid and is of use for preparation of various fluorine compounds. However, sodium hexafluorosilicate of this origin is a crude material which contains a large amount of calcium sulfate dihydrate or gypsum and, in addition, various phosphates including not only soluble ones but also insoluble and sparingly soluble ones typified by iron and aluminum phosphates. Accordingly sufficient purification is necessary to render this material really valuable as an industrial fluorine source material, but unfortunately purification of the crude fluorosilicate has encountered difficulty and required complicated procedures fundamentally because of an inevitable matter that the crude fluorosilicate is obtained in the form of very fine crystals in which are entrapped impurity phosphates.

Among various refining processes hitherto proposed for sodium hexafluorosilicate, treatment with a sodium chloride solution is known as a relatively simple and industrially favorable process, which is based on the fact that the solubility of gypsum in a sodium chloride solution is distinctly greater than that in plain water, while sodium hexafluorosilicate exhibits a remarkably smaller solubility in the same solution than in plain water. When, for example, a mixture of sodium hexafluorosilicate and gypsum is dispersed in a 25 g/l aqueous solution of sodium chloride at room temperature, the gypsum in the mixture exhibits a solubility more than twice the solubility in plain water but the fluorosilicate exhibits a solubility less than one-tenth of its solubility in plain water. It is possible to achieve the removal of gypsum from the crude fluorosilicate near to satisfaction by this refining process, accompanied with removal of considerable portions of soluble impurities such as $NaH_2PO_4$, $Na_2HPO_4$, $NaHSO_4$ and $Ca(H_2PO_4)_2$. However, the purity of sodium hexafluorosilicate refined by this process is still unsatisfactory in view of current requirements from the markets related to the preparation of high purity fluorine compounds such as synthetic cryolite and aluminum fluoride. Besides, sodium hexafluorosilicate is obtained as very fine crystals when refined by conventional processes, causing a serious inconvenience to draining and drying of the refined material.

SUMMARY OF THE INVENTION

It is an object of the present invention to provide an improved process for refining of a crude sodium hexafluorosilicate which contains gypsum and may contain phosphates as additional impurities, which process can be easily put into industrial practice and gives high purity sodium hexafluorosilicate in the form of sufficiently large crystals.

A refining process according to the invention comprises the following steps: (a) dispersing a crude sodium hexaluorosilicate which contains gypsum in an aqueous solution of sodium chloride to form a slurry and allow the gypsum to dissolve in the solution; (b) removing at least a portion of the liquid component of the slurry thereby to accomplish the removal of a substantial amount of the dissolved gypsum; (c) thereafter reconstituting an aqueous slurry of the solid component of the former slurry such that the concentration of Na in the liquid phase of this slurry is not greater than 80 g/l; (d) adding a mineral acid to this slurry so as to give an acid concentration of at least 0.1 N; (3) maintaining the resultant system at temperatures not lower than 80° C. with continued stirring to cause recrystallization of sodium hexafluorosilicate; and (f) recovering crystalline sodium hexafluorosilicate from the product of step (e).

The sodium chloride solution is not limited to a solution consisting essentially of sodium chloride and water but may be a solution comprising, together with sodium chloride, some other salts typified by magnesium chloride and magnesium sulfate such as sea water, natural salt water or artificial salt water. Preferably, steps (a) and (b) are accomplished at temperatures between room temperature and 70° C. and step (e) is continued for about 1 to 10 hr. Conveniently, sulfuric acid, hydrochloric acid or nitric acid is used as the mineral acid.

A refining process according to the invention is quite suitable for application to a crude sodium hexafluorosilicate obtained by neutralization of wet process phosphoric acid with a sodium compound such as sodium hydroxide or sodium carbonate. This refining process is advantageous in that materials consumed in the process are all cheap ones, that every step of the process is easy to perform industrially, that the refined fluorosilicate is obtained as well-grown large crystals which provide great convenience to filtration and draining, that the refining can be achieved with minimized loss of fluorine value, and that the refined fluorosilicate has a very high purity and hence a wide use including the use as the essential material of important fluorine compounds typified by synthetic cryolite and aluminum fluoride.

DESCRIPTION OF PREFERRED EMBODIMENTS

Figure 1:
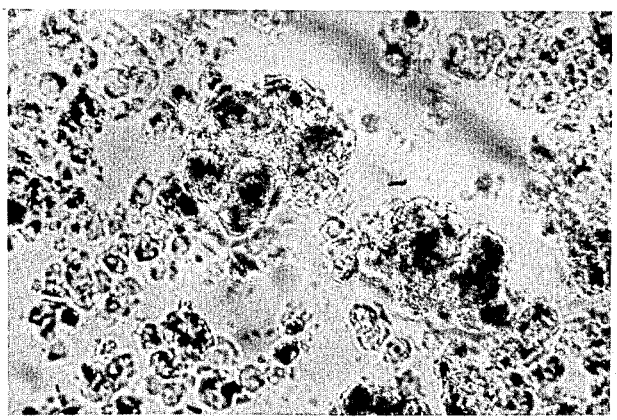
FIG. 1 is a photomicrograph of a crude sodium hexaluorosilicate.

A refining process according to the invention is characterized primarily by the steps (c), (d) and (e) in the above presented summary. The steps (a) and (b) for the removal of gypsum are not fundamentally different from the known process described hereinbefore. We have discovered that recrystallization of sodium hexafluorosilicate occurs to give sufficiently large crystals when heated near to boiling in a solution which has an appropriate acidity and is relatively low in the concentration of Na and that almost thorough purification is achieved through the recrystallization, meaning the transfer of impurities into the solution. It is an advantage of the invention that a known sodium chloride treatment for the removal of gypsum from a crude sodium hexafluorosilicate can be followed smoothly by a recrystallization process based on our such discovery.

At the step (a) of a process according to the invention, the crude fluorosilicate slurry is agitated for a period of time sufficient for practically complete dissolution of the contained gypsum. Usually it suffices to continue agitation for 5 - 60 min, depending on the amount of gypsum contained in the fluorosilicate and the temperature of the slurry. It is preferable that the slurry temperature is in the range from room temperature to 70° C. because a reaction tends to occur between gypsum and the fluorosilicate at temperatures above 70° C. Preferably, a sodium chloride solution for this treatment contains NaCl in 1 to 10 Wt%, more preferably from 1.5 to 10 Wt%, and 10 - 350 liters, more preferably 20 - 80 liters, of such a sodium chloride solution would be used per 1 kg of the crude fluorosilicate.

After completion of the agitation for dissolution of the gypsum, the liquid component of the slurry is removed either partially or almost entirely to remove at least a substantial amount of the dissolved gypsum. A practically complete removal of the dissolved gypsum can be achieved by filtration of the slurry. In this case, the separated solid component is made again into a slurry by the addition of water. In the case of partially removing the dissolved gypsum (this is permissible in a process of the invention), the slurry is allowed to stand for a while after the completion of the above described agitation, and then the supernatant liquid is removed by decantation.

It is important that the concentration of Na in the liquid component of the slurry reconstituted after the removal (either partially or entirely) of the dissolved gypsum be made not higher than 80 g/l. Water may be added to the slurry to meet this requirement. If the Na concentration is above 80 g/l, the growth of sodium hexafluorosilicate in the subsequent recrystallization step remains insufficient with the result that the treated fluorosilicate is obtained as fine crystals which present difficulty in filtration and washing and hence attaining a desirably high purity. Most preferably, the Na concentration is made below about 20 g/l.

As for the recrystallization step, it is a requisite that the addition of a mineral acid to the slurry is made such that the acid concentration in the resultant system is at least 0.1 N since recrystallization of the fluorosilicate does not occur appreciably or remains incomplete under acid concentrations below 0.1 N. There is no strict upper limit of the acid concentration, but it is preferred to maintain the acid concentration between about 0.4 N and about 1 N because little merit is appreciated in further raising the acid concentration with an economical disadvantage of consuming an unnecessarily large quantity of acid. As mentioned hereinbefore, the acidification of the slurry can be accomplished by the use of any of three popular mineral acids, sulfuric acid, hydrochloric acid and nitric acid. It is also possible to use two or more kinds of mineral acids together.

The recrystallization of the fluorosilicate in the acidified slurry, through which is achieved a thorough refining of the fluorosilicate, occurs appreciably and proceeds as intended only when the acidified slurry is maintained at temperatures not lower than 80° C. with moderate and continued stirring. In practice, an upper limit will be placed on the temperature by the boiling point of the slurry. Since the recrystallization occurs very slowly and there is a desire for sufficient growth of the recrystallized crystals, the recrystallization step should be continued for a sufficiently long period of time. Usually it suffices to complete this step in about 1 hour, but from the viewpoint of obtaining large crystals it is preferable to continue this step for about 2 - 10 hours.

Impurities, including those which are insoluble in water, entrapped in the fine crystals of the crude fluorosilicate are transferred into the hot and acidified liquid phase of the slurry upon gradual dissolution of the fluorosilicate and remain in the liquid phase at recrystallization of the fluorosilicate.

The refining process according to the invention will be illustrated by the following examples, presented together with comparative experiments not in accordance with the invention. Throughout the examples and comparative experiments, percentages are given all by weight.

EXAMPLE 1

A crude and wet sodium hexafluorosilicate containing 19.2% water was treated in this example. Analytical values for this material on the dry basis were:

| F | 50.8% |
|---|---|
| $Na_2O$ | 29.36% |
| Ca | 2.69% |
| $SO_4$ | 6.74% |
| $P_2O_5$ | 1.06% |

Figure 2:
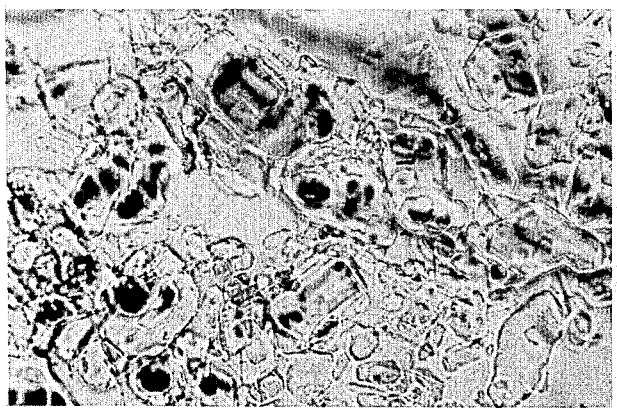
FIG. 2 is a photomicrograph of sodium hexafluorosilicate obtained by refining of the fluorosilicate of FIG. 1 by a process according to the invention.

In a stainless steel vessel which was 150 liters in capacity and equipped with a stirrer, 3.2 kg of the crude fluorosilicate was dispersed in 100 liters of sea water to give a slurry through stirring for 30 min at a temperature of 28° C. Then the slurry was kept standing and thereafter a portion of the supernatant liquid was removed by decantation so as to make the concentration of the slurry 30%. Then the slurry was poured into a stainless steel vessel of 40 liters in capacity at a rate of 13 l/hr, and simultaneously 98% sulfuric acid was poured into this vessel at a rate of 180 l/hr, with stirring, so as to make the acid concentration in the resultant mixture 0.5 N. The liquid phase of the thus acidified slurry had a Na concentration of 9.8 g/l. The acidified slurry was made to stay in this vessel for about 3 hr at a temperature of 90° C. with continued stirring thereby to accomplish refining through dissolution and recrystallization of sodium hexafluorosilicate. The resultant slurry was filtered by the use of a Nutsche funnel, and the recovered solid phase was washed with 0.4 l/kg of water, followed by drying. It was possible to accomplish the filtration at a rate of 5600 kg/m².hr and it was confirmed that the recovered solid phase was a refined sodium hexafluorosilicate in the form of much larger crystals as can be seen in the photomicrograph (300 magnification) of FIG. 2 than the crystals of the crude fluorosilicate shown by the photomicrograph (300 magnification) of FIG. 1.

The refined fluorosilicate amounted to 97.9% of the treated crude fluorosilicate and gave the following analytical values on the dry basis.

| F | 59.95% |
|---|---|
| Na | 24.22% |
| Ca | 0.001% |
| $SO_4$ | 0.004% |
| $P_2O_5$ | 0.008% |

The purity of this fluorosilicate deduced from these analytical values was 98.9% as $Na_2SiF_6$.

COMPARATIVE EXPERIMENT 1

The crude sodium hexafluorosilicate used in Example 1 was made into a 30% slurry by the apparatus and procedures of Example 1 except that 60 liters of salt water having a Na concentration of 119 g/l was used in place of the sea water in Example 1 while the quantity of the crude fluorosilicate was 3.2 kg also in this example. This slurry was acidified to have an acid concentration of 0.5 N by the addition of 98% sulfuric acid in the same manner as in Example 1, but the Na concentration in the liquid phase of the slurry was about 117 g/l. The acidified slurry was maintained in the 40 l vessel with continued stirring for about 3 hr at a temperature of 90° C. also in this experiment.

Figure 3:
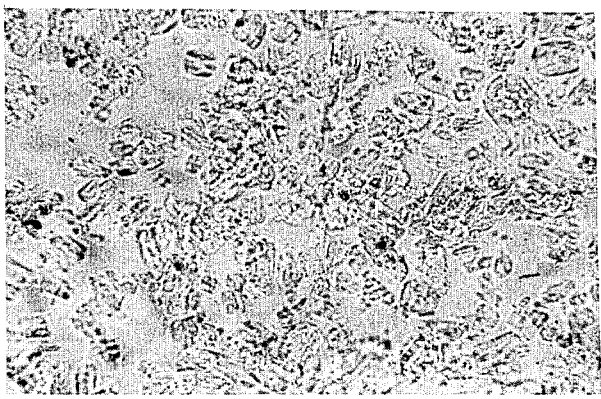
FIG. 3 is a photomicrograph of sodium hexafluorosilicate refined by a process not in accordance with the invention.

Thereafter the filtration of the treated slurry and the washing of the recovered solid phase with water were carried out according to Example 1, but in this experiment the rate of the filtration remained at a lower lever of 2300 kg/m$^2$.hr since the recovered fluorosilicate was in the form of fine crystals as seen in a 300 magnification photomicrograph of FIG. 3 and accordingly beset the path of the mother liquor. In this experiment, the refined fluorosilicate amounted to 96.5% of the crude fluorosilicate and gave the following analytical values on the dry basis.

| | |
|---|---|
| F | 59.92% |
| Na | 24.18% |
| Ca | 0.001% |
| SO$_4$ | 0.25% |
| P$_2$O$_5$ | 0.11% |

The purity of this fluorosilicate deduced from these values was 98.85% as Na$_2$SiF$_6$.

EXAMPLE 2

The crude sodium hexafluorosilicate used in Example 1 was dispersed in sea water by the procedures of Example 1 to make a 30% slurry. This slurry was poured into a stainless steel vessel of 40 liters in capacity at a rate of 15 l/hr with stirring together with 35% hydrochloric acide, which was introduced at a rate of 538 ml/hr, resulting in that the slurry had an acid concentration of 0.4 N. The concentration of Na in the liquid phase of the slurry was about 9.6 g/l. The slurry thus acidified was made to stay in this vessel for about 2.5 hr at a temperature of 90° C. with continued stirring so as to undergo thorough refining and recrystallization. Then the slurry was filtered by the use of a Nutsche funnel and the recovered solid phase was washed with 0.4 l/kg of water, followed by drying. The filtration was accomplished at a rate of 5500 kg/m$^2$.hr, and the refined fluorosilicate was obtained as crystals well grown to large sizes. The recovery of Na$_2$SiF$_6$ reached 98.1%. Analysis gave the following result (dry basis), showing that the purity of the refined fluorosilicate was 99.6% as Na$_2$SiF$_6$.

| | |
|---|---|
| F | 60.37% |
| Na | 24.36% |
| Ca | 0.001% |
| SO$_4$ | 0.004% |
| P$_2$O$_5$ | 0.005% |

COMPARATIVE EXPERIMENT 2

Example 2 was repeated except for the use of 60 liters of salt water having a Na concentration of 119 g/l in the preparation of a 30% slurry of the crude sodium hexafluorosilicate. In this experiment the rate of the filtration of the refined fluorosilicate remained at 2500 kg/m$^2$.hr because the fluorosilicate was in the form of poorly grown fine crystals and at the filtration gave a wet cake unsuitable for water passage and draining. The recovery of Na$_2$SiF$_6$ was 96.7%. Analysis gave the following result (dry basis), showing that the purity of the refined fluorosilicate was 98.9% as Na$_2$SiF$_6$.

| | |
|---|---|
| F | 60.01% |
| Na | 24.21% |
| Ca | 0.001% |
| SO$_4$ | 0.246% |
| P$_2$O$_5$ | 0.091% |

EXAMPLE 3

A crude sodium hexafluorosilicate slurry was prepared by dispersing 5 kg of the crude fluorosilicate used in Example 1 in 90 liters of salt water whose Na concentration was 119 g/l. After stirring for 20 min at room temperature, the slurry was subjected to filtration and the separated solid phase was made into a slurry by the addition of plain water to have a concentration of 30%. The liquid phase of this slurry had a Na concentration of about 2 g/l.

This slurry was poured into a stainless steel vessel of 70 liters in capacity at a rate of 10 l/hr, and simultaneously 98% sulfuric acid was introduced into the slurry at a rate of 720 ml/hr, with continued stirring, so as to afford the slurry an acid concentration of about 1 N. The acidified slurry was made to stay in this vessel for about 6 hr at a temperature of 95° C. to undergo purification and recrystallization. Thereafter the solid phase was separated from the mother liquor, washed with water and dried in the same manner as in the foregoing examples. The filtration was accomplished at a rate of 5700 kg/m$^2$.hr. The fluorosilicate was recovered as well-grown and easy-to-drain crystals in a recovery percentage of 98.8% for Na$_2$SiF$_6$. Analytical values (dry basis) were as follows and the purity of the refined fluorosilicate was deduced as 99.67% as Na$_2$SiF$_6$.

| | |
|---|---|
| F | 60.42% |
| Na | 24.41% |
| Ca | 0.001% |
| SO$_4$ | 0.004% |
| P$_2$O$_5$ | 0.004% |

COMPARATIVE EXPERIMENT 3

Similarly to Example 3, the crude sodium hexafluorosilicate was made into slurry by the use of 90 liters of the same salt water. The slurry was allowed to stand after the 20 min stirring at room temperature, and then a majority (about 82 liters) of the supernatant liquid was removed by decantation. Then about 4 liters of sea water was added to the thickened slurry so as to realize a concentration of 30%, resulting in that the Na concentration in the liquid phase became 88 g/l. This slurry was added with sulfuric acid and maintained at 95° C. with stirring in the same manner as in Example 3, and the refined fluorosilicate was recovered through the above described filtration, washing and drying procedures. The filtration was accomplished at a rate of 3100 kg/m$^2$.hr because of the refined fluorosilicate being in the form of fine crystals. The recovery of Na$_2$SiF$_6$ was 98%. Analysis gave the following result (dry basis), showing that the purity of the refined fluorosilicate was 99.3% as Na$_2$SiF$_6$.

| | |
|---|---|
| F | 60.21% |
| Na | 24.28% |
| Ca | 0.001% |
| SO$_4$ | 0.230% |
| P$_2$O$_5$ | 0.08% |

What is claimed is:

1. A process of refining a crude sodium hexafluorosilicate containing gypsum as an impurity, comprising the steps of:
    (a) dispersing the crude sodium hexafluorosilicate in an aqueous solution of sodium chloride to form a first slurry and allow the gypsum to dissolve in said solution;
    (b) removing at least a portion of the liquid component of said slurry thereby to accomplish the removal of a substantial amount of the dissolved gypsum;
    (c) reconstituting an aqueous second slurry of the solid component of said first slurry such that the concentration of Na in the liquid phase of said second slurry is not greater than 80 g/l;
    (d) adding a mineral acid to said second slurry so as to give an acid concentration of at least 0.1 N;
    (e) maintaining the acidified slurry at temperatures not lower than 80° C. with continued stirring to cause recrystallization of sodium hexafluorosilicate; and
    (f) recovering crystalline sodium hexafluorosilicate from the product of step (e).

2. A process as claimed in claim 1, wherein step (e) is continued for at least one hour.

3. A process as claimed in claim 2, wherein step (e) is continued for about 2 - 10 hours.

4. A process as claimed in claim 2, wherein said aqueous solution contains 1 - 10% by weight of NaCl, said first slurry being prepared by the use of from 10 to 350 liters of said aqueous solution per 1 kg of the crude hexafluorosilicate.

5. A process as claimed in claim 4, wherein steps (a) and (b) are performed at temperatures between room temperature and 70° C.

6. A process as claimed in claim 2, wherein said acid concentration ranges from about 0.4 N to about 1 N.

7. A process as claimed in claim 2, wherein said concentration of Na is below about 20 g/l.

8. A process as claimed in claim 1, wherein said mineral acid is selected from the group consisting of sulfuric acid, hydrochloric acid and nitric acid, including mixtures thereof.

* * * * *